US009148651B2

(12) United States Patent
Geris et al.

(10) Patent No.: US 9,148,651 B2
(45) Date of Patent: Sep. 29, 2015

(54) METHODS AND DEVICES FOR GENERATING A STEREOSCOPIC IMAGE (71) Applicant: Research In Motion Limited, Waterloo (CA)

(72) Inventors: Ryan Alexander Geris, Kitchener (CA); William Keith Baker, Belfountain (CA); Amandeep Singh Bhullar, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 364 days.

(21) Appl. No.: 13/645,628

(22) Filed: Oct. 5, 2012

(65) Prior Publication Data
US 2014/0098197 A1   Apr. 10, 2014

(51) Int. Cl.
H04N 13/04   (2006.01)
H04N 13/02   (2006.01)

(52) U.S. Cl.
CPC ....... *H04N 13/0242* (2013.01); *H04N 13/0296* (2013.01)

(58) Field of Classification Search
CPC .......... H04N 13/0296; H04N 13/0242; H04N 13/0239; H04N 13/0048; H04N 13/0059; H04N 13/0404; H04N 13/00; H04N 13/0022; H04N 13/0207; G02B 23/2415
USPC .......................................................... 348/48
See application file for complete search history.

(56) References Cited

U.S. PATENT DOCUMENTS

| 4,547,050 | A | * | 10/1985 | Collender | 352/43 |
| 5,023,725 | A | * | 6/1991 | McCutchen | 348/38 |
| 5,396,583 | A | * | 3/1995 | Chen et al. | 345/427 |
| 5,430,474 | A | * | 7/1995 | Hines | 348/42 |
| 5,703,961 | A | * | 12/1997 | Rogina et al. | 382/154 |
| 5,721,585 | A | * | 2/1998 | Keast et al. | 348/36 |
| 6,108,005 | A | * | 8/2000 | Starks et al. | 345/419 |
| 6,711,355 | B1 | * | 3/2004 | Smart et al. | 396/316 |
| 7,271,803 | B2 | * | 9/2007 | Ejiri et al. | 345/427 |
| 8,207,961 | B2 | * | 6/2012 | Song et al. | 345/419 |

(Continued)

FOREIGN PATENT DOCUMENTS

WO   WO 2012103554 A2 *   8/2012   ............. G03B 15/03

OTHER PUBLICATIONS

EPO, Extended European Search Report relating to application No. 12187463.0 dated Dec. 21, 2012.

(Continued)

*Primary Examiner* — Shan Elahi
(74) *Attorney, Agent, or Firm* — Rowand LLP (57) ABSTRACT Methods and devices for generating a stereoscopic image are described. In one aspect, the electronic device includes a first camera for generating first camera data, a second camera for generating second camera data and a third camera for generating third camera data. The cameras are positioned on a same side of the electronic device and in spaced relation to each other. The electronic device also includes a controller coupled with the first camera, the second camera and the third camera. The controller is configured to: identify an orientation of the electronic device; and generate a stereoscopic image based on the first camera data and the second camera data when the electronic device is at a first orientation, and generate the stereoscopic image based on the first camera data and the third camera data when the electronic device is at a second orientation.

16 Claims, 6 Drawing Sheets

(56) References Cited

U.S. PATENT DOCUMENTS

| | | | |
|---|---|---|---|
| 8,436,893 B2* | 5/2013 | Mcnamer et al. | 348/50 |
| 8,548,269 B2* | 10/2013 | Zargarpour et al. | 382/284 |
| 8,890,934 B2* | 11/2014 | Li et al. | 348/43 |
| 2001/0043737 A1* | 11/2001 | Rogina et al. | 382/154 |
| 2003/0209893 A1* | 11/2003 | Breed et al. | 280/735 |
| 2005/0167558 A1* | 8/2005 | Smith | 248/317 |
| 2007/0248260 A1* | 10/2007 | Pockett | 382/154 |
| 2008/0278571 A1 | 11/2008 | Mora et al. | |
| 2009/0219437 A1* | 9/2009 | Baugher et al. | 348/385.1 |
| 2010/0194860 A1 | 8/2010 | Mentz et al. | |
| 2010/0207774 A1* | 8/2010 | Song | 340/669 |
| 2011/0025829 A1* | 2/2011 | Mcnamer et al. | 348/50 |
| 2011/0098083 A1* | 4/2011 | Lablans | 455/556.1 |
| 2011/0117958 A1 | 5/2011 | Kim et al. | |
| 2011/0216160 A1* | 9/2011 | Martin | 348/40 |
| 2011/0217638 A1* | 9/2011 | Kim et al. | 430/20 |
| 2011/0228051 A1* | 9/2011 | Dedeoglu et al. | 348/46 |
| 2012/0028678 A1* | 2/2012 | Lim et al. | 455/556.1 |
| 2012/0033048 A1 | 2/2012 | Ogawa et al. | |
| 2012/0038635 A1* | 2/2012 | Stamate et al. | 345/419 |
| 2012/0038747 A1* | 2/2012 | Kim et al. | 348/47 |
| 2012/0050857 A1* | 3/2012 | Lee et al. | 359/464 |
| 2012/0056998 A1* | 3/2012 | Kang et al. | 348/47 |
| 2012/0154548 A1* | 6/2012 | Zargarpour et al. | 348/48 |
| 2012/0182401 A1* | 7/2012 | Kobayashi et al. | 348/51 |
| 2012/0200495 A1* | 8/2012 | Johansson | 345/156 |
| 2012/0287125 A1* | 11/2012 | Liu | 345/419 |
| 2013/0113783 A1* | 5/2013 | Pourbigharaz | 345/419 |
| 2013/0208099 A1* | 8/2013 | Ohmi | 348/54 |
| 2014/0066122 A1* | 3/2014 | Shukla et al. | 455/556.1 |

OTHER PUBLICATIONS

CIPO, CA Office Action relating to Application No. 2,827,531, dated Feb. 16, 2015.

* cited by examiner

METHODS AND DEVICES FOR GENERATING A STEREOSCOPIC IMAGE

TECHNICAL FIELD

The present disclosure relates to camera systems, and more particularly, to methods and devices for generating a stereoscopic image.

BACKGROUND

Electronic devices such as smartphones and tablet computers are often equipped with one or more cameras. For example, electronic devices may be equipped with a front-facing camera, which is oriented to capture an image of a subject located near a side of the electronic device which includes the main display of the electronic device. Electronic devices may also be equipped with a rear facing camera, which is oriented to capture an image of a subject located near a side of the electronic device which does not include the main display of the electronic device.

Electronic devices equipped with cameras often provide various features and functionalities for the cameras. A user of the electronic device may control camera features to capture an image based on the user's preferences. Features of the cameras that may be controlled include the camera lens aperture size, shutter speed, external flash, zooming, focusing, etc.

Some electronic devices provide camera features for stereoscopic image capture and display. Such electronic devices are often equipped with two cameras that are on a common side (e.g. that are both on a rear side) of the electronic device and spaced apart.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In one aspect, the present application describes an electronic device for generating a stereoscopic image. The electronic device includes a first camera for generating first camera data, a second camera for generating second camera data and a third camera for generating third camera data. The cameras are positioned on a same side of the electronic device and in spaced relation to each other. The electronic device also includes a controller coupled with the first camera, the second camera and the third camera. The controller is configured to: identify an orientation of the electronic device; and generate a stereoscopic image based on the first camera data and the second camera data when the electronic device is at a first orientation, and generate the stereoscopic image based on the first camera data and the third camera data when the electronic device is at a second orientation.

In another aspect, the present application describes a method implemented by a controller of an electronic device for generating a stereoscopic image. The electronic device includes a first camera for generating first camera data, a second camera for generating second camera data and a third camera for generating third camera data. The cameras are positioned on a same side of the electronic device and in spaced relation to each other. The method includes: identifying an orientation of the electronic device; and generating a stereoscopic image based on the first camera data and the second camera data when the electronic device is at a first orientation, and generating the stereoscopic image based on the first camera data and the third camera data when the electronic device is at a second orientation.

In yet another aspect, the present application describes a computer readable storage medium. The computer readable storage medium includes computer executable instructions for generating a stereoscopic image. The computer executable instructions includes instructions for: identifying an orientation of the electronic device; and generating a stereoscopic image based on the first camera data and the second camera data when the electronic device is at a first orientation, and generating the stereoscopic image based on the first camera data and the third camera data when the electronic device is at a second orientation.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
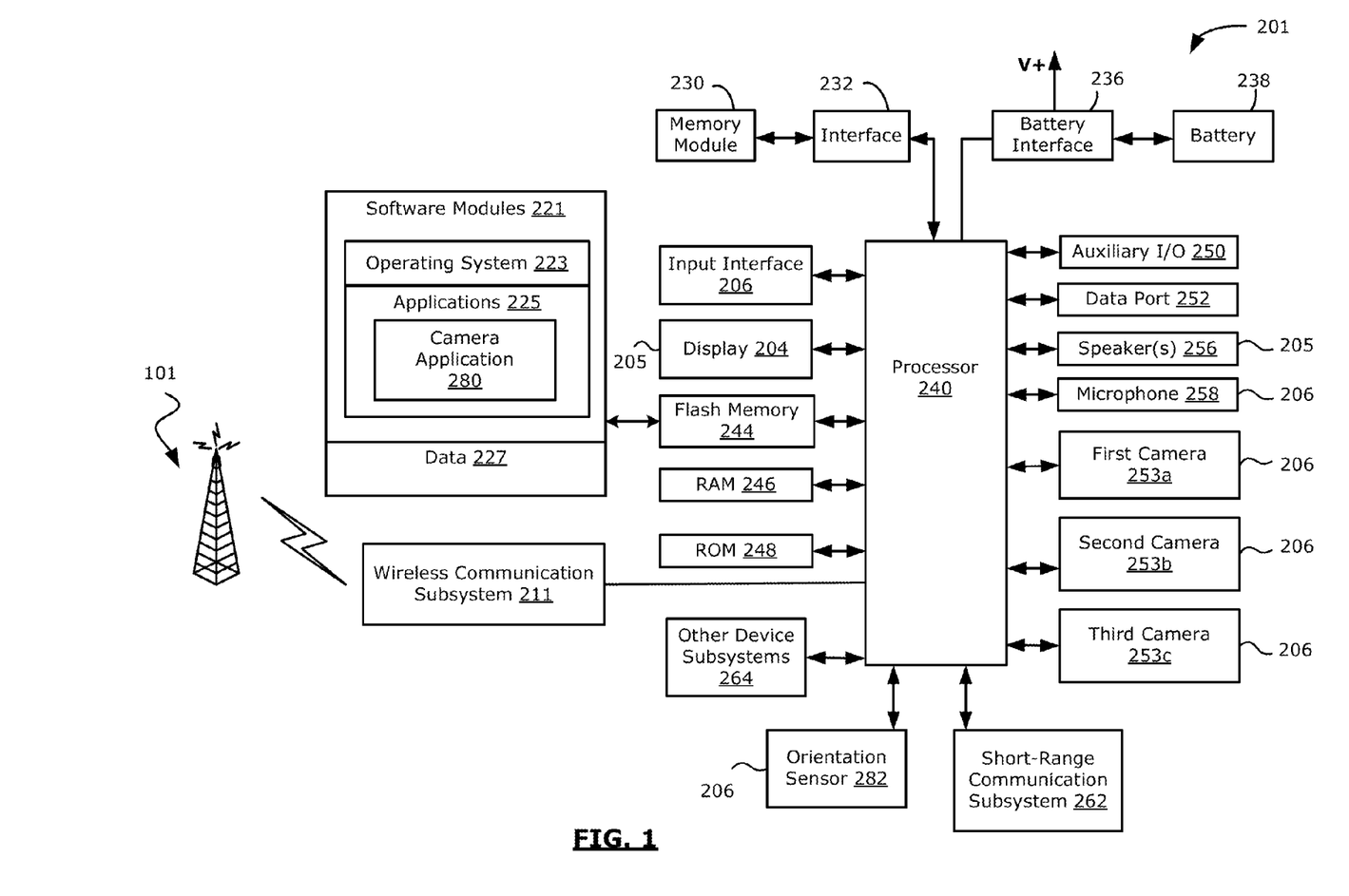
FIG. 1 is a block diagram of an example electronic device in accordance with example embodiments of the present disclosure.

Reference is first made to FIG. 1 which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a housing, housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. It will be appreciated that, in at least some example embodiments, the controller may, instead of or in addition to the processor 240, include an analog circuit or other types of circuits capable of performing a part or all of the functions of the processor 240 that are described herein. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a display 204 and/or a speaker 256), one or more input interfaces 206 (such as a first camera 253a, a second camera 253b, a third camera 253c, a microphone 258, a keyboard (not shown), an orientation sensor 282, control buttons (not shown), a touch-sensitive overlay (not shown) associated with a touchscreen display and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display 204). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The particular design of the wireless communication subsystem 211 depends on the wireless network 101 in which the electronic device 201 is intended to operate. The wireless network 101 may include one or more of a Wireless Wide Area Network (WWAN) and/or a Wireless Local Area Network (WLAN) and/or other suitable network arrangements. In some example embodiments, the electronic device 201 is configured to communicate over both the WWAN and WLAN, and to roam between these networks. The electronic device 201 may send and receive communication signals over the wireless network 101 via the wireless communication subsystem 211 after the required network registration or activation procedures have been completed.

In at least some example embodiments, the auxiliary input/output (I/O) subsystems 250 may include an external communication link or interface; for example, an Ethernet connection. The electronic device 201 may include other wireless communication interfaces for communicating with other types of wireless networks 101; for example, a wireless network 101 such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (i.e. touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes a first camera 253a, a second camera 253b and a third camera 253c. The cameras 253a, 253b, 253c are capable of capturing camera data such as images in the form of still photographs and/or motion video. The camera data may be captured in the form of an electronic signal which is produced by an image sensor associated with each of the cameras 253a, 253b, 253c. Pairs of the cameras 253a, 253b, 253c may collectively be capable of capturing stereoscopic images for display. That is, a selected pair of the cameras 253a, 253b, 253c may collectively produce stereoscopic image data which defines a stereoscopic image. Stereoscopic images may provide an illusion of depth in the images to a user (i.e. three dimensional (3-D) images).

To produce stereoscopic image data, the cameras 253a, 253b, 253c are oriented in generally the same direction (e.g. the cameras 253a, 253b, 253b may be positioned on the same side of the electronic device 201). For example, as will be discussed below, in at least some example embodiments, all of the cameras 253a, 253b, 253c may be rear-facing. That is, the cameras 253a, 253b, 253c are, in some example embodiments, arranged to capture an image of a subject on a rear side of the electronic device 201.

The cameras 253a, 253b, 253c are mounted in spaced relation to one another. That is, there may be a space between each of the cameras 253a, 253b, 253c. For example, the first camera 253a and the second camera 253b are spaced apart in order to collectively capture a stereoscopic image, the first camera 253a and the third camera 253c are spaced apart in order to collectively capture a stereoscopic image. In some embodiments, the second camera 253b and the third camera 253c are spaced apart in order to collectively capture a stereoscopic image. The distances between a pair of the cameras 253a, 253b, 253c that may be used for generating a stereoscopic image may be approximately the same as the distance between a standard person's eyes (which is around 6.35 cm). In at least some example embodiments, the distances between a pair of the cameras 253a, 253b, 253c that may be used for generating a stereoscopic image may be smaller or larger than the distance between a person's eyes, and the distances may be of varying lengths from one another. A larger distance between any two of the cameras 253a, 253b, 253c may allow for capturing a stereoscopic image that produces an enhanced effect of stereoscopy to a user.

Since the cameras 253a, 253b, 253c are offset from one another, so too are the images they produce. That is, the first camera 253a captures a first image (i.e. captures first camera data defining a first image), and the second camera 253b captures a second image (i.e. captures second camera data defining a second image) that is offset from the first image, and the third camera captures a third image (i.e. captures third camera data defining a third image) that is offset from the both the first image and the second image. The first image, second image and third image are captured at different positions from one another due to the positioning of the first camera 253a, the second camera 253b and the third camera 253c. The offset between any two of the images (for example, the first image and the second image) is defined by the distance (referred to as the intra-axial distance) between the respective two cameras (for example, the first camera 253a and the second camera 253b).

Accordingly, stereoscopic image data may be produced by the cameras 253a, 253b, 253c. Such stereoscopic image data includes a combination of two images—for example, a first image produced using the first camera 253a, and either a second image produced using the second camera 253b or a third image produced using the third camera 253c. The images used in the combination may be captured at the same time or approximately the same time, but may be offset in appearance due to the spacing between the cameras 253a, 253b, 253c.

In at least some example embodiments, the cameras 253a, 253b, 253c are arranged in such a manner that a combination of two of the cameras 253a, 253b, 253c is configured to capture stereoscopic images only at specific orientations of the electronic device 201. For example, a combination of two of the cameras 253a, 253b, 253c may capture stereoscopic images when the two cameras are horizontally aligned (that is, a line passing through the midpoint of the cameras are aligned with the horizon) for a particular orientation of the electronic device 201.

For example, the first camera 253a and the second camera 253b may be horizontally aligned when the electronic device 201 is at a first orientation (which may be a portrait orientation of the electronic device); the first camera 253a and the third camera 253c may be horizontally aligned when the electronic device 201 is at a second orientation (which may be a landscape orientation of the electronic device 201). The second camera 253b and the third camera 253c may be horizontally aligned when the electronic device 201 is at a third orientation (which may be a tilted orientation that is in between the portrait orientation and the landscape orientation of the electronic device 201). Accordingly, the first camera 253a and the second camera 253b may capture stereoscopic images when the electronic device 201 is at the first orientation; the first camera 253 and the third camera 253c may capture stereoscopic images when the electronic device 201 is at the second orientation. In some embodiments, the second camera 253b and the third camera 253c may capture stereoscopic images when the electronic device 201 is at the third orientation (in this orientation, some rotation may be applied to the images from the camera before generating a stereoscopic image).

When the electronic device 201 is not within a predefined threshold from one of these orientations, the cameras 253a, 253b, 253c may, in some example embodiments, not be configured to capture stereoscopic images as no two cameras 253a, 253b, 253c are horizontally aligned (for example, with respect to the horizon). In at least some example embodiments, when the electronic device 201 is not at one of the positions where a pair of cameras 253a, 253b, 253c are horizontally aligned, the electronic device 201 may generate a stereoscopic image using a pair of cameras 253a, 253b, 253c which are closest to horizontal alignment.

Since only two cameras are required to generate a stereoscopic image, one or more of the cameras may be disabled based on the orientation of the electronic device 201. For example, In at least some example embodiments, the camera that is not horizontally aligned with another camera when the other two cameras are horizontally aligned for a particular orientation of the electronic device 201, may be disabled for operation for that orientation of the electronic device 201 (for example, the third camera 253c may be disabled when the electronic device 201 is at the first orientation). Greater details of such configurations are discussed below with reference to FIGS. 3 to 6.

The cameras 253a, 253b, 253c may all be configured as front facing cameras or may all be configured as rear facing cameras. Front facing cameras are provided by cameras 253a, 253b, 253c that are located to obtain images near a front face of the electronic device 201. The front face is typically the face on which a main display 204 is mounted. That is, when front facing cameras are provided on the electronic device 201, the display 204 is configured to display content which may be viewed from a side of the electronic device 201 where the cameras 253a, 253b, 253c are directed.

Rear facing cameras are provided by cameras 253a, 253b, 253c which are located to obtain images of a subject near a rear side of the electronic device 201. The rear side is typically a side which does not include the main display 204 of the electronic device 201. In at least some embodiments, the electronic device 201 may operate in one operating mode in which the display 204 acts as a viewfinder displaying image data associated with rear facing cameras.

The rear facing cameras may obtain images which are not within the field of view of the front facing cameras. The field of view of the front facing and rear facing cameras may generally be in opposing directions.

While FIG. 1 illustrates three cameras 253a, 253b, 253c, the electronic device 201 may include more than three cameras 253a, 253b, 253c.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

In at least some example embodiments, the electronic device 201 may include one or more sensors. For example, the electronic device 201 may include an orientation sensor 282 that detects the orientation of the electronic device 201 or that generates information from which the orientation of the electronic device 201 can be determined, such as acceleration information. In some example embodiments, the orientation sensor 282 is an accelerometer, such as a three-axis accelerometer. An accelerometer is a sensor which converts acceleration from motion (e.g. movement of the electronic device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer. In other example embodiments, the orientation sensor 282 may be of other forms instead of or in addition to an accelerometer. For example, the orientation sensor 282 may be a gravity sensor, a gyroscope, a tilt sensor, an electronic compass or other suitable sensors, or combinations thereof.

The orientation sensor 282 may generate orientation data which specifies the orientation of the electronic device 201. The orientation data, in at least some example embodiments, specifies the orientation of the electronic device 201 relative to the gravitational field of the earth. In at least some example embodiments, the received orientation data may be classified to determine a particular orientation of the electronic device 201, such as a portrait orientation, a landscape orientation and/or one or more orientations in between a portrait orientation and landscape orientation (i.e. the classified orientation data may indicate the typical orientations of the electronic device 201 when held by a user to capture images). Accordingly, in at least some example embodiments, the orientation data may be used to configure the electronic device 201 to capture stereoscopic images for a particular orientation of the electronic device 201. For example, the orientation data may be used to identify the orientation of the electronic device 201 and enable two of the cameras 253a, 253b, 253c that are horizontally aligned at the identified orientation of the electronic device 201 to capture stereoscopic images.

The electronic device 201 also includes or is connectable to a power source such as a battery 238. The battery 238 may be one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, image data, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory.

The electronic device 201 may, in at least some example embodiments, be a mobile communication device which may provide two principal modes of communication: a data communication mode and a voice communication mode. In the data communication mode, a received data signal such as a text message, an email message, or a web page download are processed by the wireless communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using the input devices in conjunction with the display 204. These composed items may be transmitted through the wireless communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (e.g., a voice communication module) and hardware (e.g., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The software applications 225 on the electronic device 201 may also include a range of additional applications including, for example, a notepad application, Internet browser application, voice communication (e.g. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

A predetermined set of applications that control basic device operations, including data and possibly voice communication applications may be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The processor 240 may be electrically connected to the cameras 253a, 253b, 253c to allow the processor 240 to receive electronic signals representing camera data from the cameras 253a, 253b, 253c.

In at least some embodiments, the software modules 221 may include one or more camera applications 280 or software modules which are configured for handling the electronic signals representing camera data from the cameras 253a, 253b, 253c. The camera application 280 may, for example, be configured to provide a viewfinder on the display 204 by displaying, in real time or near real time, images defined in the electronic signals received from the cameras 253a, 253b, 253c. The camera application 280 may also be configured to capture images or videos by storing images or videos defined by the electronic signals received from the cameras 253a, 253b, 253c. For example, the camera application 280 may be configured to store the images or videos to memory, for example the flash memory 244 of the electronic device 201. The images may be stored in various formats including JPEG, RAW, BMP etc.

The camera application 280 may also be configured to control options or preferences associated with the cameras 253a, 253b, 253c. For example, the camera application 280 may be configured to control camera lens apertures and/or shutter speeds associated with the cameras 253a, 253b, 253c. The control of such features may, in at least some example embodiments, be automatically performed by the camera application 280 based on output received from a light exposure meter.

In at least some example embodiments, the camera application 280 may be configured to control a flash associated with the cameras 253a, 253b, 253c and/or to control a zoom level associated with the cameras 253a, 253b, 253c. In at least some example embodiments, the camera application 280 is configured to provide digital zoom features. The camera application 280 may provide digital zoom features by cropping an image down to a centered area with the same aspect ratio as the original. In at least some example embodiments, the camera application 280 may interpolate within the cropped image to bring the cropped image back up to the pixel dimensions of the original. The camera application 280 may, in at least some example embodiments, provide image stabilization for the cameras 253a, 253b, 253c. Image stabilization may reduce blurring associated with movement of the cameras 253a, 253b, 253c.

In at least some example embodiments, the camera application 280 may be configured to focus the cameras 253a, 253b, 253c on a subject. More particularly, the camera application 280 may be configured to control actuators of the cameras 253a, 253b, 253c to move lenses (a lens may be comprised of one or more lens elements) in the cameras 253a, 253b, 253c relative to image sensors in the cameras 253a, 253b, 253c. For example, when capturing images of subjects which are very close to the cameras 253a, 253b, 253c (e.g. subject at macro position), the camera application 280 may control the actuators to cause the actuators to move the lenses away from the image sensors.

In at least some example embodiments, the camera application 280 (or another application 225) may be configured to process electronic signals of images captured by cameras 253a, 253b, 253c for stereoscopic display. That is, the camera application 280 may assemble camera data obtained from the cameras 253a, 253b, 253c into one or more stereoscopic images.

In at least some example embodiments, the camera application 280 may be configured to allow for simultaneous operation of all the cameras 253a, 253b, 253c (or, in at least some example embodiments, at least a combination of two of the cameras 253a, 253b, 253c depending on the orientation of the electronic device 201). That is, the camera application 280 may allow the cameras 253a, 253b, 253c to simultaneously capture images. For example, a user may input an instruction to the electronic device 201 via an input interface 206 instructing the electronic device 201 to capture an image. In response, the electronic device 201 may simultaneously capture an image using the first camera 253a, the second camera 253b and the third camera 253c (or, in at least some example embodiments, capture an image using a combination of two of the cameras 253a, 253b, 253c); a first image (defined by first camera data) is captured using the first camera 253a, a second image (defined by second camera data) is captured using the second camera 253b, and a third image (defined by third camera data) is captured using the third camera 253c. These images may be captured at approximately the same time. In at least some example embodiments, based on the orientation of the electronic device 201, two of these images may collectively form stereoscopic image data.

In at least some example embodiments, the camera application 280 (or another application 225) may be configured to control the generation of stereoscopic images. For example, the camera application 280 may change the combination of two of the cameras 253a, 253b, 253c to capture stereoscopic images when the orientation of the electronic device 201 is changed (i.e. it may select which pair of cameras 253a, 253b, 253c to use based on the orientation).

For example, in at least some example embodiments, the camera application 280 may identify an orientation of the electronic device 201 (which may include determining whether the electronic device 201 is at a first orientation or a second orientation (or even a third orientation)), and generate a stereoscopic image based on first camera data and second camera data when the electronic device 201 is at the first orientation, and generate the stereoscopic image based on first camera data and third camera data when the electronic device 201 is at the second orientation (in at least some example embodiments, the camera application 280 may further generate the stereoscopic image based on the second camera data and the third camera data when the electronic device 201 is at the third orientation). That is, the first camera 253a and the second camera 253b are enabled to capture stereoscopic images when the electronic device 201 is at the first orientation, and the first camera 253a and the third camera 253c are enabled to capture stereoscopic images when the electronic device 201 is at the second orientation.

Specific functions and features of the camera application 280 will be discussed in greater detail below with reference to FIG. 8.

While the embodiment discussed above includes a processor 240 coupled with a camera application 280 which collectively act as an image signal processor to provide image related functions such as auto-focusing, in other example embodiments (not shown), another processor such as a dedicated image signal processor, may provide some or all of these functions.

In at least some example embodiments, the operating system 223 may perform some or all of the functions of the camera application 280. In other example embodiments, the functions or a portion of the functions of the camera application 280 may be performed by one or more other applications.

Further, while the camera application 280 has been illustrated as a stand-alone application, in other example embodiments, the camera application 280 may be implemented as part of the operating system 223 or another application 225. Furthermore, in at least some example embodiments, the functions of the camera application 280 may be provided by a plurality of software modules. In at least some example embodiments, these software modules may be divided among multiple applications.

Example Electronic Device

As discussed above, the electronic device 201 may take a variety of forms. For example, in at least some example embodiments, the electronic device 201 may be a smartphone.

Figure 2:
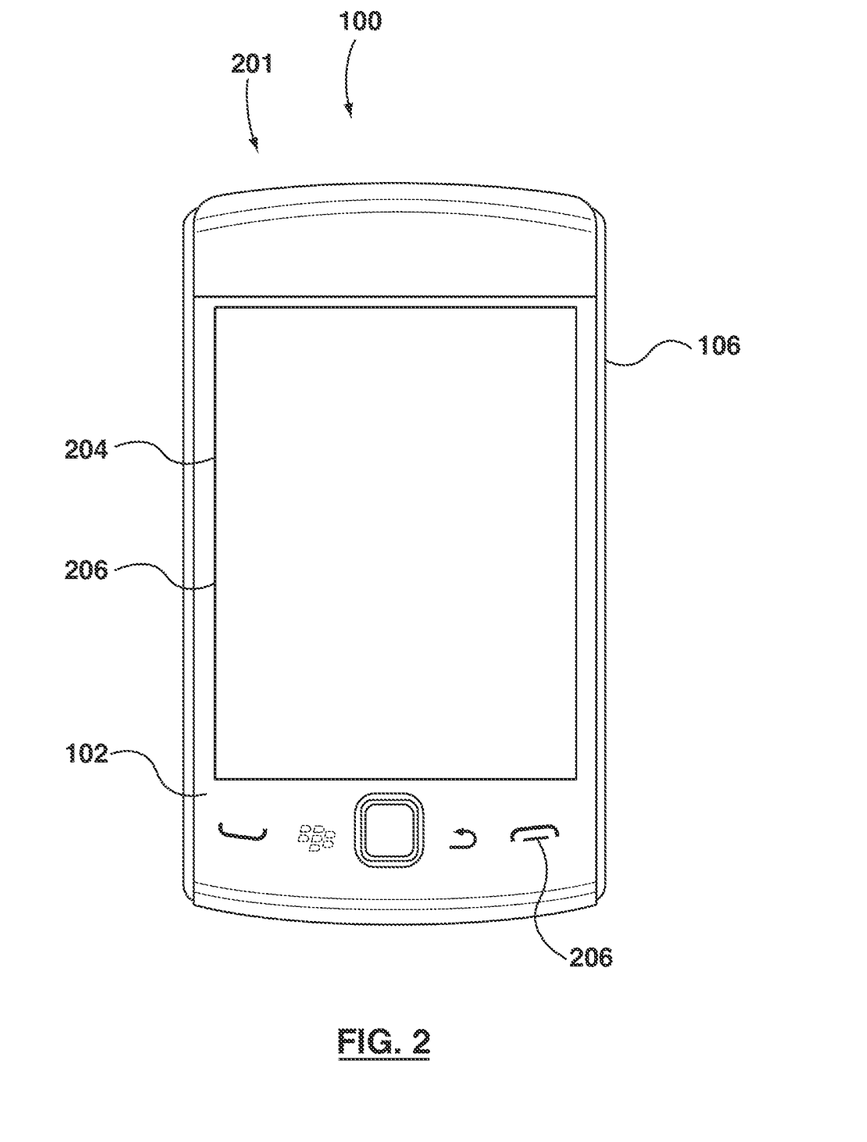
FIG. 2 is a front view of an example electronic device in accordance with example embodiments of the present disclosure.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone 100.

The smartphone 100 may include the components discussed above with reference to FIG. 1 or a subset or superset of those components. The smartphone 100 includes a housing 106 which houses at least some of the components discussed above with reference to FIG. 1.

In the example embodiment illustrated, the electronic device 201 includes a display 204, which may be a touch-screen display which acts as an input interface 206. The display 204 is disposed within the electronic device 201 so that it is viewable at a front side 102 of the electronic device 201. That is, a viewable side of the display 204 is disposed on the front side 102 of the electronic device 201. In the example embodiment illustrated, the display 204 is framed by the housing 106.

The example electronic device 201 also includes other input interfaces 206 such as one or more buttons, keys or navigational input mechanisms. In the example embodiment illustrated, at least some of these additional input interfaces 206 are disposed for actuation at a front side 102 of the electronic device 201.

Figure 3:
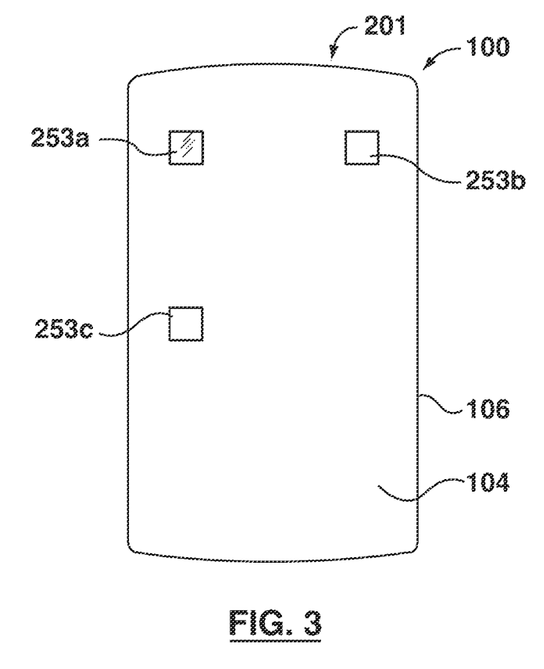
FIG. 3 is an example rear view of the example electronic device of FIG. 2.
Figure 4:
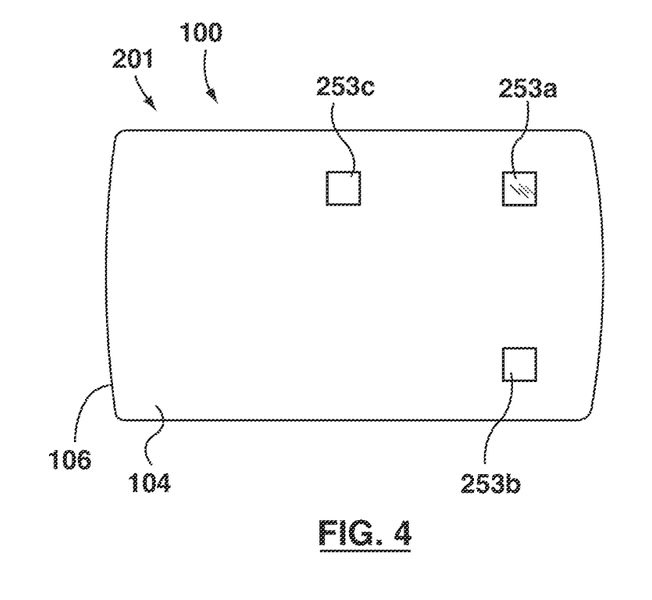
FIG. 4 is another example rear view of the example electronic device of FIG. 2.
Figure 5:
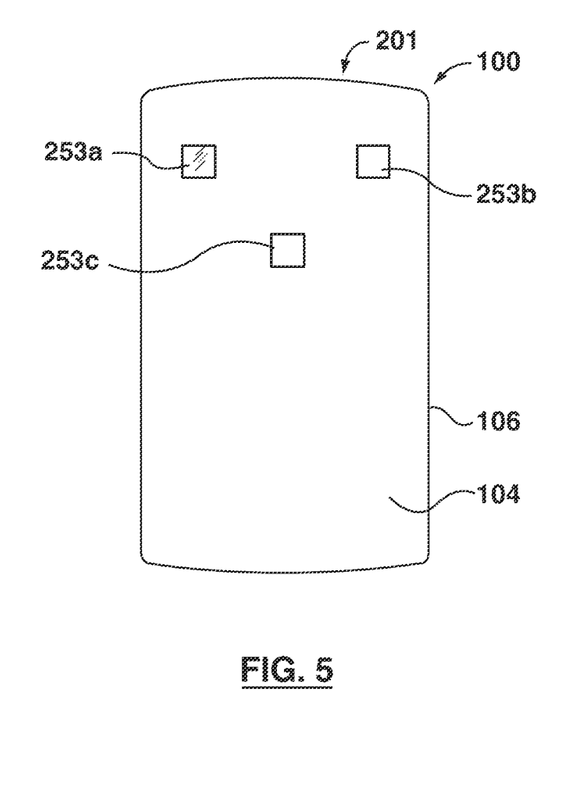
FIG. 5 is a rear view of another example electronic device.
Figure 6:
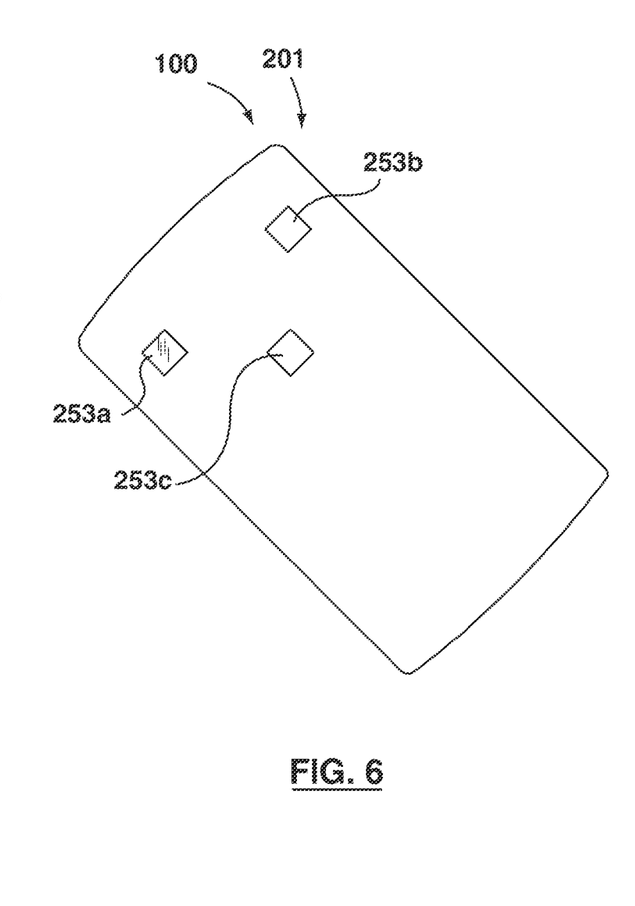
FIG. 6 is another example rear view of the example electronic device of FIG. 5.

Reference will now be made to FIGS. 3 to 6 which show example embodiments of the electronic device 201 (which is a smartphone 100 in the illustrated example embodiment). More particularly, FIG. 3 illustrates an example rear view of the electronic device 201. FIG. 4 illustrates another example rear view of the electronic device 201. FIG. 5 illustrates a further example rear view of another example embodiment of the electronic device 201. FIG. 6 illustrates a yet further example rear view of the electronic device 201. Reference will be first made to the embodiment of FIGS. 3 and 4.

Referring first to FIG. 3, an example rear view of the example electronic device 201 is illustrated. The example electronic device 201 includes a first camera 253a, a second camera 253b and a third camera 253c that are positioned on a same side of the electronic device 201. More particularly, the cameras 253a, 253b, 253c are configured as rear facing cameras located on a rear side 104 of the electronic device 201. That is, the rear facing cameras are located on a side of the electronic device 201 which does not include the display 204. The rear facing cameras are located so that they may capture images of objects which are located in the rear of and/or surrounding the rear side 104 of the electronic device 201. In at least some example embodiments, the electronic device 201 may operate in at least one operating mode in which the display 204, on the front side 102 of the electronic device 201, acts as a viewfinder displaying image data associated with the rear facing cameras.

In at least some example embodiments, the electronic device 201 may also include one or more front facing cameras instead of, or in addition to, the rear facing cameras. The front facing cameras may be located on the front side 102 of the electronic device 201.

As mentioned above, the cameras 253a, 253b, 253c may be configured to capture stereoscopic images. For example, the cameras 253a, 253b, 253c that are horizontally aligned for a particular orientation of the electronic device 201 may be enabled to capture stereoscopic images (e.g. a pair of cameras 253a, 253b, 253c may be aligned when that pair is substantially parallel with the horizon). For example, a combination of two of the cameras 253a, 253b, 253c may be configured to capture stereoscopic images when the electronic device 201 is orientated at a first orientation; while, a different combination of two of the cameras 253a, 253b, 253c may be configured to capture stereoscopic images when the electronic device 201 is orientated at a second orientation.

In the illustrated example, the electronic device 201 is held in a first orientation which is a portrait orientation (where its height is longer than its width) in which the first camera 253a and the second camera 253b are horizontally aligned (i.e. a line extending between the midpoint of these two cameras is substantially horizontal). The first camera 253a and the second camera 253b are enabled to capture stereoscopic images when the electronic device 201 is at the portrait orientation. Similarly, when the orientation of the electronic device 201 is changed to a second orientation such as a landscape orientation (which will be discussed with reference to FIG. 4), the first camera 253a and the third camera 253c are horizontally aligned. The first camera 253a and the third camera 253c are enabled to capture stereoscopic images when the electronic device 201 is held in the landscape orientation.

The electronic device 201 of FIG. 3 is illustrated at a portrait orientation where the first camera 253a and the second camera 253b are horizontally aligned. In at least some example embodiments, the orientation of the electronic device 201 may be changed as illustrated in FIG. 4, which shows another example rear view of the electronic device 201.

With reference to FIG. 4, the electronic device 201 is orientated to a landscape orientation (where its width is longer than its height). At the landscape orientation, the first camera 253a and the third camera 253c are horizontally aligned and may be configured to capture stereoscopic images (i.e. the first camera 253a and the third camera 253c may be used at the landscape orientation instead of the first camera 253a and the second camera 253b).

In at least some example embodiments, the electronic device 201 may include an orientation sensor 282 (FIG. 1), that generates orientation data based on the orientation of the electronic device 201. Accordingly, the electronic device 201 may identify an orientation of the electronic device 201 based on the orientation data, and enable two of the cameras 253a, 253b, 253c to capture stereoscopic images based on the orientation of the electronic device 201. That is, the two cameras that are horizontally aligned at the identified orientation of the electronic device 201 are configured to capture stereoscopic images. For example, in at least some example embodiments, in identifying the orientation of the electronic device 201, the electronic device 201 may determine whether the electronic device 201 is at a portrait orientation (as shown in FIG. 3) or a landscape orientation (as shown in FIG. 4) based on the orientation data. If the electronic device 201 is determined to be at a portrait orientation, the first camera 253a and the second camera 253b are enabled to capture stereoscopic images as the first camera 253a and the second camera 253b are in horizontal alignment with each other. While, if the electronic device 201 is determined to be at a landscape orientation, the first camera 253a and the third camera 253c are enabled to capture stereoscopic images as the first camera 253*a* and the third camera 253*c* are in horizontal alignment.

As the cameras 253*a*, 253*b*, 253*c* are fixed (i.e. they are stationary relative to the electronic device 201), there are a limited number of orientations of the electronic device 201 at which at least a combination of two of the cameras 253*a*, 253*b*, 253*c* are horizontally aligned. Furthermore, in at least some example embodiments, a pair of the cameras 253*a*, 253*b*, 253*c* may not be used to generate a stereoscopic image if that pair of cameras 253*a*, 253*b*, 253*c* is oriented such that images generated by the cameras 253*a*, 253*b*, 253*c* would have to undergo a rotation that would require part of the images to be cropped in order to generate a stereoscopic image. For example, in at least some example embodiments, the second camera 253*b* and the third camera 253*c* would be prevented from generating a stereoscopic image since the images created by those cameras would have to be rotated in a manner that would require considerable cropping in order to create a stereoscopic image. Accordingly, in the illustrated example embodiments of FIGS. 3 and 4, only two pairs of cameras 253*a*, 253*b*, 253*c* may be used to generate stereoscopic images. These camera pairs are associated with two orientations—a landscape or portrait orientations of the electronic device 201. Accordingly, the electronic device 201 may be configured to capture stereoscopic images when the electronic device 201 is either at a landscape orientation or a portrait orientation. That is, the electronic device 201 may allow capture of stereoscopic images only at two orientations (i.e. the first orientation or the second orientation) of the electronic device 201, and may not allow capture of stereoscopic images when the electronic device 201 is at other orientations. In such example embodiments, if the electronic device 201 determines that the orientation of the electronic device 201 is not at the first orientation or the second orientation, none of the cameras 253*a*, 253*b*, 253*c* are enabled to capture stereoscopic images. It will be appreciated that the electronic device 201 may be considered to be "at" an orientation if it is within a predetermined threshold of that orientation.

However, in at least some example embodiments, the electronic device 201 may be configured to capture stereoscopic images even when it is at orientations other than the first orientation or the second orientation. In such example embodiments, the electronic device 201 may determine whether the orientation of the electronic device 201 is closer to the landscape orientation or to the portrait orientation. For example, the electronic device 201 may utilize the orientation data to perform the determination process when the electronic device 201 is oriented between the portrait orientation and the landscape orientation. If the electronic device 201 determines that the orientation of the electronic device 201 is closer to the portrait orientation, the electronic device 201 may enable the first camera 253*a* and the second camera 253*b* to capture stereoscopic images. That is, if the electronic device 201 is tilted closer to the portrait orientation than the landscape orientation, the first camera 253*a* and the second camera 253*b* are configured to capture stereoscopic images. If the electronic device 201 determines that the orientation of the electronic device 201 is closer to the landscape orientation, the electronic device 201 may enable the first camera 253*a* and the third camera 253*c* to capture stereoscopic images. That is, if the electronic device 201 is tilted closer to the landscape orientation than the portrait orientation, the first camera 253*a* and the third camera 253*c* are configured to capture stereoscopic images.

In at least some example embodiments, the electronic device 201 may allow operation of at least two of the cameras 253*a*, 253*b*, 253*c* to capture stereoscopic images at a third orientation of the electronic device 201, in addition to the first orientation and the second orientation of the electronic device 201. That is, a pair of the cameras 253*a*, 253*b*, 253*c* may be horizontally aligned when the electronic device 201 is at the third orientation. In the illustrated examples of FIGS. 3 and 4, the second camera 253*b* and the third camera 253*c* may be horizontally aligned when the electronic device 201 is at a clockwise tilted orientation that is in between the portrait orientation and the landscape orientation (i.e. the second camera 253*b* and the third camera 253*c* are in alignment with the horizon). Accordingly, the first camera 253*a* and the second camera 253*b* may capture stereoscopic images when the electronic device 201 is at the portrait orientation; the first camera 253*a* and the third camera 253*c* may capture stereoscopic images when the electronic device 201 is at the landscape orientation; and the second camera 253*b* and the third camera 253*c* may capture stereoscopic images when the electronic device 201 is at the clockwise tilted orientation.

In at least some example embodiments, the camera that is not horizontally aligned with the other two cameras that are horizontally aligned for a particular orientation of the electronic device 201, is disabled (i.e. the camera may not operate to capture any form of camera data). For example, the third camera 253*c* is disabled when the electronic device 201 is at the portrait orientation (as shown in FIG. 3) and the second camera 253*b* is disabled when the electronic device 201 is at the landscape orientation (as shown in FIG. 4). Accordingly, camera data may be received from only two of the cameras 253*a*, 253*b*, 253*c* when the electronic device 201 is either at a portrait orientation or a landscape orientation.

However, in other example embodiments, the camera that is not horizontally aligned with the other two horizontally aligned cameras may not be disabled and remain operable. In such example embodiments, the three cameras 253*a*, 253*b*, 253*c* may be configured to simultaneously (or near simultaneously) capture images (for example, in response to receiving an instruction to trigger the cameras 253*a*, 253*b*, 253*c*) prior to generating a stereoscopic image from the images of two of the cameras. For example, the third camera 253*c* may simultaneously capture an image when the first camera 253*a* and the second camera 253*b* captures stereoscopic images at the portrait orientation of the electronic device 201, and the second camera 253*b* may simultaneously capture an image when the first camera 253*a* and the third camera 253*c* captures stereoscopic images at the landscape orientation of the electronic device 201.

The cameras 253*a*, 253*b*, 253*c* may be fixedly attached to the electronic device 201 and they may not move (or rotate) relative to the electronic device 201 when the electronic device 201 moves. That is, the cameras 253*a*, 253*b*, 253*c* remain stationary relative to the electronic device 201 when the orientation of the electronic device 201 is changed (for example, from a portrait orientation to a landscape orientation).

In some example embodiments, an image captured by the first camera 253*a* may be rotated to correct for a change in orientation. Accordingly, in at least some example embodiments, an image captured by the first camera 253*a* may be rotated prior to generating a stereoscopic image when the electronic device 201 is at the second orientation (for example, the landscape orientation). The rotation of the captured image may be performed by a lossy and/or lossless method as appreciated by those skilled in the art.

In other example embodiments, instead of using a software rotation, the first camera 253*a* may be capable of rastering in two directions. For example, the first camera 253*a* may raster in a direction associated with the portrait orientation and a direction associated with the landscape orientation. The electronic device 201 may control the direction of raster based on the orientation of the electronic device 201.

In the example embodiments of FIGS. 3 and 4, the cameras 253*a*, 253*b*, 253*c* are shown to be positioned as a right triangle on the rear side 104 of the electronic device 201. The first camera 253*a* is positioned at the corner of the right triangle that forms a ninety degree, and the second camera 253*b* and the third camera 253*c* are positioned at the other corners of the right triangle. That is, the first camera 253*a* is positioned at the intersection of a side of the triangle formed by the first camera 253*a* and the second camera 253*b*, and a side of the triangle formed by the first camera 253*a* and the third camera 253*c*. The first camera 253*a* is also positioned opposite a side of the triangle formed by the second camera 253*b* and the third camera 253*c*. Accordingly, the first camera 253*a* is horizontally aligned with the second camera 253*b* when the electronic device 201 is at the portrait orientation (as shown in FIG. 3), and horizontally aligned with the third camera 253*c* when the electronic device 201 is at the landscape orientation (as shown in FIG. 4).

It will be appreciated that the cameras 253*a*, 253*b*, 253*c* positioned to form a right triangle (as shown in FIGS. 3 and 4) may be located differently to form the right triangle. For example, in at least some example embodiments, the first camera 253*a* may be positioned at an opposite 90 degree corner on the rear side of the electronic device 201. That is, rather than being positioned at a top left corner where the first camera 253*a* is horizontally aligned with the second camera 253*b* when the electronic device 201 is at the portrait orientation, the first camera 253*a* may positioned at a middle right corner where it is horizontally aligned with the third camera 253*c* when the electronic device 201 at the portrait orientation.

In at least some example embodiments, the cameras 253*a*, 253*b*, 253*c* may be positioned to form other triangular formations besides a right triangle. One such example embodiment will now be illustrated with reference to FIGS. 5 and 6.

By way of example, in the example embodiment of FIGS. 5 and 6, the cameras 253*a*, 253*b*, 253*c* are positioned to form a triangle on the rear side of the electronic device 201. The first camera 253*a* may be positioned at the corner of the triangle that forms an angle between thirty and sixty degrees, and the second camera 253*b* and the third camera 253*c* may be positioned at the other corners of the triangle.

More particularly, in FIGS. 5 and 6, the cameras 253*a*, 253*b*, 253*c* are shown positioned to form an isosceles triangle with the first camera 253*a* and the second camera 253*b* positioned at the base corners of the triangle that each form a forty five degree angle, and the third camera 253*c* positioned at the apex corner. That is, the side opposite the first camera 253*a* (i.e. the second camera 253*b* and the third camera 253*c* side) and the side opposite the second camera 253*b* (i.e. the first camera 253*a* and the third camera 253*c* side) are of equal length, and the third camera 253*c* is located at the apex of the triangle with the side opposite the third camera 253*c* (i.e. the first camera 253*a* and the second camera 253*b*) forming the base of the triangle.

Accordingly, as shown in FIG. 5, the first camera 253*a* is horizontally aligned with the second camera 253*b* when the electronic device 201 is at a portrait orientation (i.e. a first orientation). That is, the first camera 253*a* and the second camera 253*b* are enabled to capture stereoscopic images when the electronic device 201 is held at the portrait orientation. While, as shown in FIG. 6, the first camera 253*a* is horizontally aligned with the third camera 253*c* when the electronic device 201 is at a counter-clockwise tilted orientation of forty five degrees between the portrait orientation and the landscape orientation (i.e. the first camera 253*a* and the third camera 253*c* are in alignment with the horizon at such a second orientation). That is, the first camera 253*a* and the third camera 253*c* are enabled to capture stereoscopic images when the electronic device 201 is held counter-clockwise tilted by forty five degrees.

As mentioned above, in at least some example embodiments, the cameras 253*a*, 253*b*, 253*c* may not form an isosceles triangle (i.e. the first camera 253*a* corner and the second camera 253*b* corner have different angles), and/or the first camera 253*a* corner may have an angle that is different than forty five degrees (i.e. another angle between thirty and sixty degrees). In such example embodiments, the first camera 253*a* and the third camera 253*c* are horizontally aligned when the electronic device 201 is tilted based on the first camera 253*a* corner angle. For example, if the first camera 253*a* corner forms a fifty degree angle, the first camera 253*a* and the third camera 253*c* are horizontally aligned to capture stereoscopic images when the electronic device 201 is at a tilted orientation of fifty degrees.

Figure 7:
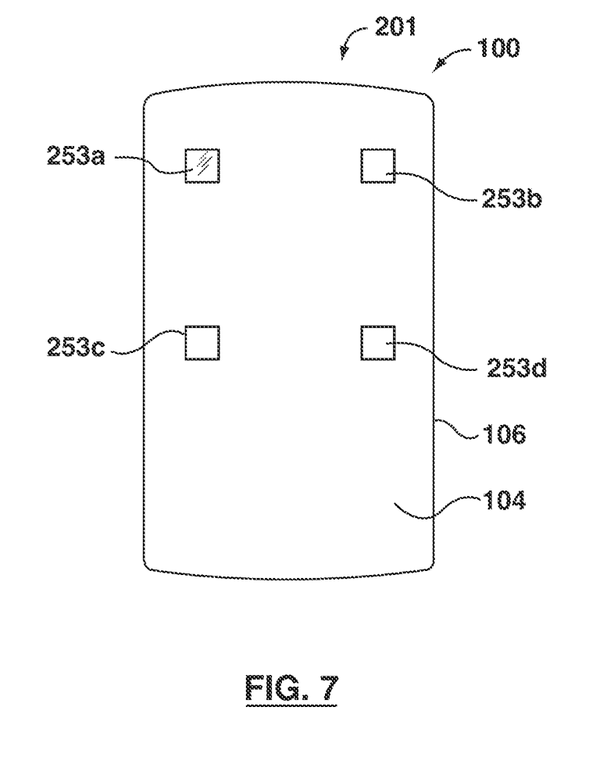
FIG. 7 is a rear view of a further example electronic device.

In at least some example embodiments, the electronic device 201 may include more than three cameras, for example four cameras, that are all located on the same side of the electronic device 201. Reference will now be made to FIG. 7 which shows one such example embodiment of the electronic device 201.

FIG. 7 illustrates another example rear view of the electronic device 201 of FIG. 2. The example electronic device 201 (which is a smartphone 100 in the example illustrated) includes a first camera 253*a*, a second camera 253*b*, a third camera 253*c* and a fourth camera 253*d* that are configured as rear facing cameras located on the rear side of the electronic device 201. In such example embodiments, the cameras may be configured to capture stereoscopic images. That is, a combination of two of the cameras that are horizontally aligned for a particular orientation of the electronic device 201 may be enabled to capture stereoscopic images (e.g. they may be aligned with the horizon). For example, a combination of two of the cameras may be configured to capture stereoscopic images when the electronic device 201 is oriented at a first orientation; a different combination of two of the cameras may be configured to capture stereoscopic images when the electronic device 201 is oriented at a second orientation; and a further different combination of two of the cameras may be configured to capture stereoscopic images when the electronic device 201 is oriented at a third orientation.

In the illustrated example, the first camera 253*a* and the second camera 253*b* are horizontally aligned and enabled to capture stereoscopic images when the electronic device 201 is at the portrait orientation. When the orientation of the electronic device 201 is changed to a landscape orientation, the first camera 253*a* and the third camera 253*c* are horizontally aligned and enabled to capture stereoscopic images. When the orientation of the electronic device is changed to a counter-clockwise tilted orientation that is between the landscape orientation and the portrait orientation, the first camera 253*a* and the fourth camera 253*d* are horizontally aligned and enabled to capture stereoscopic images. Additionally, when the orientation of the electronic device 201 is changed to a clockwise tilted orientation that is between the landscape orientation and the portrait orientation, the second camera 253*b* and the third camera 253*c* are horizontally aligned and enabled to capture stereoscopic images. Thus, the use of four cameras may allow stereoscopic images to be obtained in a greater number of orientations.

As shown in FIG. 7, more than a combination of two of the cameras may be horizontally aligned for particular orientations of the electronic device 201. For example, the third camera 253c and the fourth camera 253d may additionally be horizontally aligned when the electronic device 201 is at the portrait orientation, and the second camera 253b and the fourth camera 253d may additionally be horizontally aligned when the electronic device 201 is at the landscape orientation. In such example embodiments, the other combination of two cameras may additionally be enabled to capture stereoscopic images. For example, when the electronic device 201 is held at the portrait orientation, the first camera 253a and the second camera 253b are enabled to capture stereoscopic images, and the third camera 253c and the fourth camera 253d are also enabled to capture stereoscopic images. While, when the electronic device 201 is held at the landscape orientation, the first camera 253a and the third camera 253c are enabled to capture stereoscopic images, and the second camera 253b and the fourth camera 253d are also enabled to capture stereoscopic images. The stereoscopic images of the two combinations of cameras may be captured at the same time or at different times.

It will be appreciated that, in at least some example embodiments, the four cameras may be positioned differently on the rear side 104 of the electronic device 201. Additionally, in at least some example embodiments, the electronic device 201 may include more than four cameras. For example, in at least some example embodiments, the electronic device 201 may include eight cameras that are all positioned on the same side of the electronic device 201 (for example, the rear side 104 of the electronic device 201). More particularly, the eight cameras are positioned to form a clock formation such that each camera is opposite another camera to form four pairs of opposing cameras, and each pair of opposing cameras is horizontally aligned at four different orientations of the electronic device 201. A pair of cameras may be selected for generating a stereoscopic image based on the orientation of the electronic device. That is, the electronic device 201 may select which of the pairs is closest to horizontal alignment and may use that pair. It will be appreciated that a greater number of cameras may be used.

Generating a Stereoscopic Image

Figure 8:
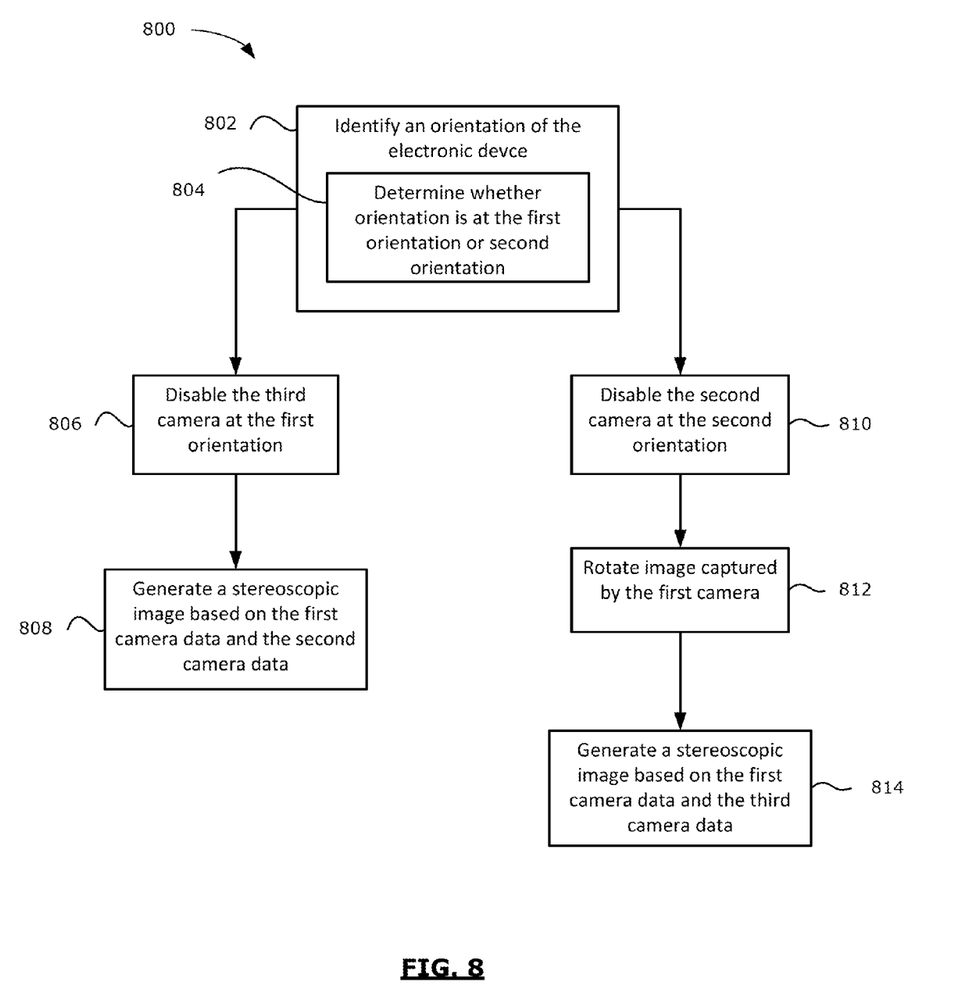
FIG. 8 is a flowchart illustrating an example method of generating a stereoscopic image in accordance with example embodiments of the present disclosure.

Referring now to FIG. 8, a flowchart of an example method 800 of generating a stereoscopic image is illustrated. The electronic device 201 may be configured to perform the method 800 of FIG. 8. In at least some example embodiments, the controller (which may include the processor 240 and/or an analog circuit) of the electronic device 201 is configured to perform the method 800 of FIG. 8. One or more applications 225 or modules on the electronic device 201 may contain computer readable instructions which cause the controller of the electronic device 201 to perform the method 800 of FIG. 8. In at least some example embodiments, the camera application 280 stored in memory of the electronic device 201 is configured to perform the method 800 of FIG. 8. More particularly, the camera application 280 may contain computer readable instructions which, when executed, cause the controller to perform the method 800 of FIG. 8.

It will be appreciated that the method 800 of FIG. 8 may, in at least some example embodiments, be provided by other software applications or modules apart from those specifically discussed above, for example the operating system 223. Accordingly, any features which are referred to as being performed by the electronic device 201 may be performed by any one or more of the software applications or modules referred to above or other software modules. In at least some example embodiments, at least some of the method 800 of FIG. 8 may be performed by or may rely on other applications or modules.

The method 800 includes, at 802, identifying an orientation of the electronic device 201. The electronic device 201 may include an orientation sensor 282 (FIG. 1), that generates orientation data based on the orientation of the electronic device 201. Accordingly, the electronic device 201 may identify the orientation of the electronic device 201 based on the obtained orientation data.

In at least some example embodiments, as part of the identification process, the electronic device 201, at 804, may determine whether the electronic device 201 is at a first orientation or a second orientation based on the orientation data. In such example embodiments, the orientation data may be analyzed to classify the orientation of the electronic device 201 as one of a predefined set of possible orientations, such as, a portrait orientation, a landscape orientation and/or specific tilted orientations in between a portrait orientation and a landscape orientation (i.e. the first orientation and second orientation each represent one of these types of orientations of the electronic device 201). In at least some example embodiments, the electronic device 201 may determine whether its orientation falls within the one of two classified orientations.

In at least some example embodiments, rather than determining whether the orientation of the electronic device 201 is at the one of two orientations (i.e. the first orientation or the second orientation), the electronic device 201 may determine whether its orientation is closer to the first orientation or the second orientation based on the orientation data. For example, the electronic device 201 may identify that its orientation is between the landscape orientation (i.e. the first orientation) and the portrait orientation (i.e. the second orientation), and further determine whether its tilted orientation is closer to the landscape orientation or the portrait orientation.

If it is determined that the electronic device 201 is at the first orientation, the electronic device 201, at 806, may disable the third camera 253c. That is, the third camera 253c may not operate to capture any form of camera data. For example, the non-horizontally aligned cameras (e.g. relative to the horizon) for a particular orientation of the electronic device 201 are disabled. That is, the third camera 253c which is not horizontally aligned with any of the other cameras when the electronic device 201 is at the first orientation is disabled.

If it is determined that the electronic device 201 is at the first orientation, at 808, the electronic device 201 may generate a stereoscopic image based on the first camera data of the first camera 253a and the second camera data of the second camera 253b. That is, the first camera 253a and the second camera 253b are horizontally aligned and enabled to capture stereoscopic images when the electronic device 201 is at the first orientation. For example, a user holding the electronic device 201 at the first orientation may trigger both the first camera 253a and the second camera 253b (via an input interface 206 associated with the electronic device 201) to capture images simultaneously (or near simultaneously) that are processed to produce stereoscopic images. Accordingly, the first camera 253a and the second camera 253b may be configured to capture stereoscopic images.

However, if it is determined that electronic device 201 is at the second orientation, the electronic device 201, at 810, may instead disable the second camera 253b from operating. For example, the non-horizontally aligned second camera 253b is disabled when the electronic device 201 is at the second orientation.

At 812, the electronic device 201 may rotate an image captured by the first camera 253a prior to generating stereoscopic images (from the first camera 253a and the third camera 253c). That is, when the electronic device 201 moves to a second orientation, an image captured by the first camera 253a may need to be rotated to correct for a change in orientation. The rotation of the captured image may be performed by a lossy and/or lossless method as appreciated by those skilled in the art.

When the electronic device 201 is determined to be at the second orientation, at 814, the electronic device 201, may generate a stereoscopic image based on the first camera data of the first camera 253a and the third camera data of the third camera 253c. That is, the first camera 253a and the third camera 253c are horizontally aligned and enabled to capture stereoscopic images when the electronic device 201 is at the second orientation. For example, a user holding the electronic device 201 at the second orientation may trigger both the first camera 253a and the third camera 253c (via an input interface associated with the electronic device 201) to capture images simultaneously (or near simultaneously) that are processed to produce stereoscopic images. Accordingly, the first camera 253a and the third camera 253c may be configured to capture stereoscopic images.

While, at 806 and 810, one of the cameras 253a, 253b, 253c is disabled when the electronic device 201 is either at the first orientation or the second orientation, in at least some example embodiments, these cameras may not be disabled. That is, all of the cameras 253a, 253b, 253c may be enabled and may be configured to capture images simultaneously prior to generating stereoscopic images. For example, a user may trigger each of the cameras 253a, 253b, 253c (via an input interface 206 associated with the electronic device 201) to simultaneously capture images.

As mentioned above, in at least some example embodiments, the electronic device 201 may, at 804, instead determine whether the electronic device 201 is closer to a first orientation or a second orientation. In such example embodiments, 806 and 808 may be performed in response to the electronic device 201 determining that its orientation is closer to the first orientation; and 810, 812 and 814 may be performed in response to the electronic device 201 determining that its orientation is closer to the second orientation.

While the present application is described in terms of an electronic device 201 and methods, it will be appreciated that the present application is also directed to an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device comprising:
a first camera for generating first image data, a second camera for generating second image data and a third camera for generating third image data, the cameras positioned on a same side of the electronic device and in spaced relation to each other;
an orientation sensor, the orientation sensor generating orientation data based on an orientation of the electronic device; and
a controller coupled with the orientation sensor, the first camera, the second camera and the third camera, which:
identifies the orientation of the electronic device; and
generates a stereoscopic image based on the first image data and the second image data when the electronic device is at a first orientation, and generates the stereoscopic image based on the first image data and the third image data when the electronic device is at a second orientation,
wherein identifying the orientation of the electronic device includes determining whether the electronic device is closer to the first orientation or the second orientation based on the orientation data, and wherein the stereoscopic image is generated based on the first image data and the second image data when the orientation of the electronic device is closer to the first orientation and the stereoscopic image is generated based on the first image data and the third image data when the orientation of the electronic device is closer to the second orientation.

2. The electronic device of claim 1, wherein the cameras are positioned to form a right triangle, the first camera positioned at the corner of the right triangle that forms a ninety degree angle, the second camera and the third camera positioned at the other corners of the right triangle, and wherein the first camera and the second camera are horizontally aligned when the electronic device is at the first orientation and the first camera and the third camera are horizontally aligned when the electronic device is at the second orientation.

3. The electronic device of claim 1, wherein the cameras are positioned to form a triangle, the first camera positioned at a corner of the triangle forming an angle between thirty and sixty degrees, the second camera and the third camera positioned at the other corners of the triangle, and wherein the first camera and the second camera are horizontally aligned when the electronic device is at the first orientation and the first camera and the third camera are horizontally aligned when the electronic device is at the second orientation.

4. The electronic device of claim 1, wherein the first orientation of the electronic device is a portrait orientation and the second orientation of the electronic device is a landscape orientation.

5. The electronic device of claim 1, wherein the controller rotates an image captured by the first camera prior to generating the stereoscopic image when the electronic device is in the second orientation.

6. The electronic device of claim 1, wherein the controller disables the third camera when the electronic device is at the first orientation.

7. The electronic device of claim 1, wherein the controller disables the second camera when the electronic device is at the second orientation.

8. The electronic device of claim 1, wherein the controller captures images simultaneously by the first camera, the second camera and the third camera prior to generating the stereoscopic image.

9. The electronic device of claim 1, further comprising:
a fourth camera for generating fourth image data, the fourth camera positioned on the same side and in spaced relation to the first camera, the second camera and the third camera, and wherein identifying an orientation of the electronic device includes identifying a third orientation of the electronic device, and wherein the controller generates the stereoscopic image based on the first image data and the fourth image data when the electronic device is at the third orientation.

10. A method implemented by a controller of an electronic device, the electronic device having an orientation sensor coupled to the controller, a first camera for generating first image data, a second camera for generating second image data and a third camera for generating third image data, the cameras positioned on a same side of the electronic device and in spaced relation to each other, the method comprising:
generating orientation data at the orientation sensor based on an orientation of the electronic device;
identifying the orientation of the electronic device; and
generating a stereoscopic image based on the first image data and the second image data when the electronic device is at a first orientation, and generating the stereoscopic image based on the first image data and the third image data when the electronic device is at a second orientation,
wherein identifying the orientation of the electronic device includes determining whether the electronic device is closer to the first orientation or the second orientation based on the orientation data, and wherein the stereoscopic image is generated based on the first image data and the second image data when the orientation of the electronic device is closer to the first orientation and the stereoscopic image is generated based on the first image data and the third image data when the orientation of the electronic device is closer to the second orientation.

11. The method of claim 10, wherein the first orientation of the electronic device is a portrait orientation and the second orientation of the electronic device is a landscape orientation.

12. The method of claim 10, further comprising rotating an image captured by the first camera prior to generating the stereoscopic image when the electronic device is in the second orientation.

13. The method of claim 10, further comprising disabling the third camera when the electronic device is at the first orientation.

14. The method of claim 10, further comprising disabling the second camera when the electronic device is at the second orientation.

15. The method of claim 10, further comprising capturing images simultaneously by the first camera, the second camera and the third camera prior to generating the stereoscopic image.

16. A non-transitory, tangible computer readable storage medium encoded with computer executable instructions, wherein execution of the computer executable instructions is for:
generating orientation data based on an orientation of an electronic device;
identifying the orientation of the electronic device; and
generating a stereoscopic image based on first image data from a first camera and second image data from a second camera when the electronic device is at a first orientation, and generating the stereoscopic image based on the first image data and third image data from a third camera when the electronic device is at a second orientation,
wherein identifying the orientation of the electronic device includes determining whether the electronic device is closer to the first orientation or the second orientation based on the orientation data, and wherein the stereoscopic image is generated based on the first image data and the second image data when the orientation of the electronic device is closer to the first orientation and the stereoscopic image is generated based on the first image data and the third image data when the orientation of the electronic device is closer to the second orientation.

* * * * *